Figure 1:
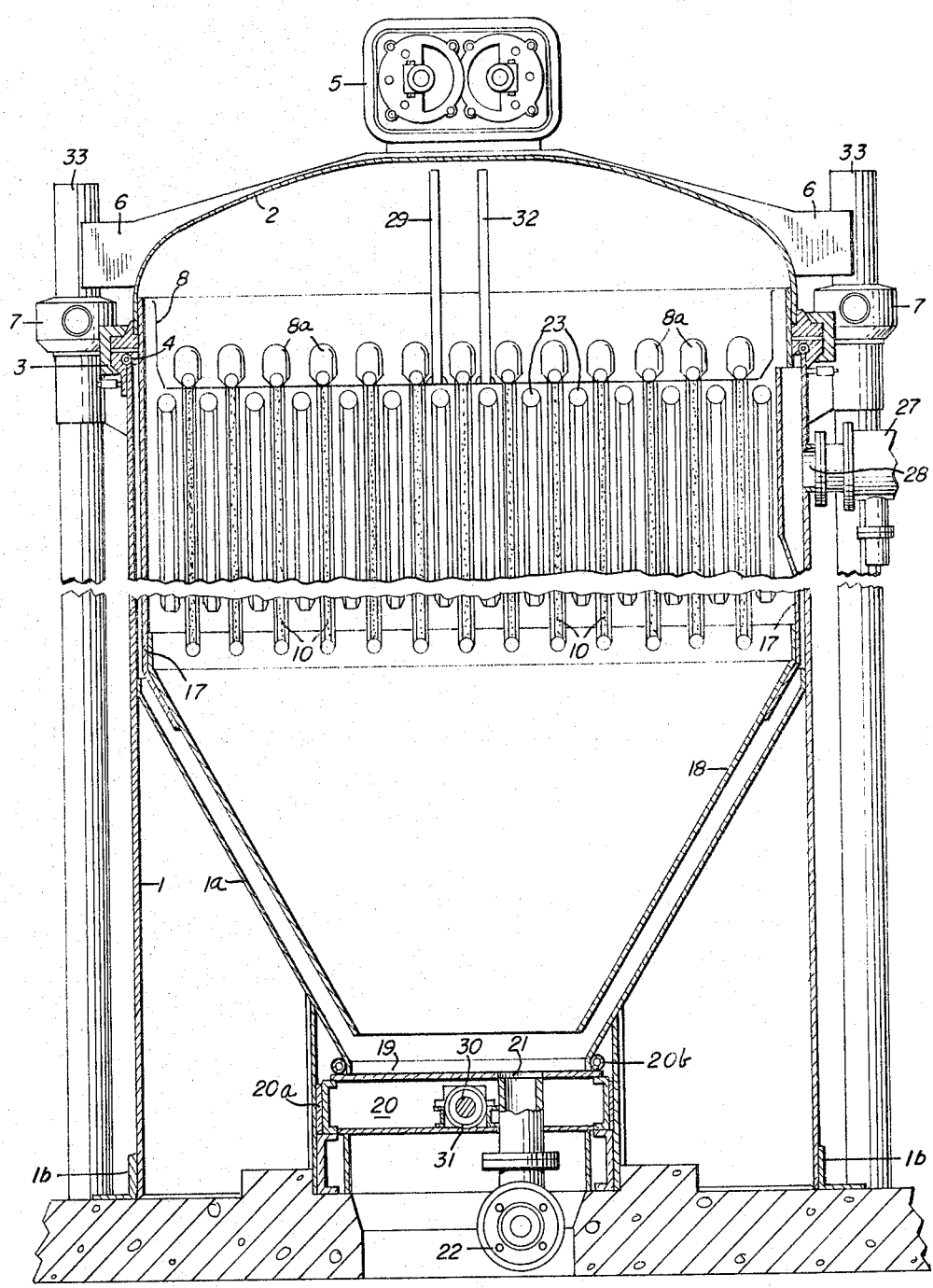

Oct. 4, 1966   G. F. KATYKHOVSKY   3,276,593
AUTOMATIC FILTER
Filed Oct. 19, 1962   3 Sheets-Sheet 1

Oct. 4, 1966 G. F. KATYKHOVSKY 3,276,593
AUTOMATIC FILTER
Filed Oct. 19, 1962 3 Sheets-Sheet 2

United States Patent Office 3,276,593
Patented Oct. 4, 1966

3,276,593
AUTOMATIC FILTER
Guennady Feodorovich Katykhovsky, 3 Ulitsa Usievicha
2 Appart 41, Moscow, U.S.S.R.
Filed Oct. 19, 1962, Ser. No. 235,594
6 Claims. (Cl. 210—333)

This invention relates to an automatic filter assemblage, and more particularly to frame filter assemblages operating under pressure or vacuum conditions.

It is known that filters of this type do not ensure removal of the deposit accumulated upon the surfaces of the filter elements or the discharge thereof in the extruded or dried state from the device without opening the same.

This shortcoming is especially discernable when toxic or radiant suspensions are filtrated, as in this case the removal of the deposit from the surfaces of the filter elements, and the discharge thereof from the device consumes considerable time, and in addition, inevitably causes dangerous operating conditions which threaten the safety of the servicing personnel.

The present assemblage for cyclic action for the filtration of various suspensions including the toxic or radiant ones is free from the above mentioned defect.

It has been established that the filter enables all the operations of the filter process to be effected automatically, very intensively and under complete airtight conditions. The filter differs from the known devices used for the same purpose by its structural relationship which assures automatic removal of the deposit from the filter elements and from the assemblage at pre-set time intervals. This is accomplished by transmitting vibrations of the necessary frequency and amplitude to the vertically installed filter elements in their plane and the simultaneous supply of compressed air from the outside into the ducts of these elements.

The extruded and direct deposit drops upon a guide unloading cone positioned beneath the filter elements and to which vibrations are simultaneously transmitted in the vertical plane with the complete deposit sliding down the cone to a discharge manhole or opening and through which manhole the deposit is delivered in the required direction.

The transmission of the vibrations to the filter elements and guide unloading cone without opening the assemblage or providing communication with the atmospheric conditions existing in the room is preferably accomplished via the cover of the assemblage which may move vertically within the pre-set ranges. The cover is carried by elastic supports which receive the weight thereof and the vibrator is secured to external central position of the cover with the filter elements and guide unloading cone being rigidly affixed to the interior of the cover.

The object of the given invention is to provide an automatic filter assemblage of cyclic action for ensuring intensive removal of the deposit from the surface of the filter cloth and for discharging the extruded and dried deposit from the assemblage under complete airtight conditions.

Another object of the invention is to provide an automatic filter assemblage for ensuring the complete and prompt removal of the deposit falling from the surface of the filter elements from the assemblage.

Figure 2:
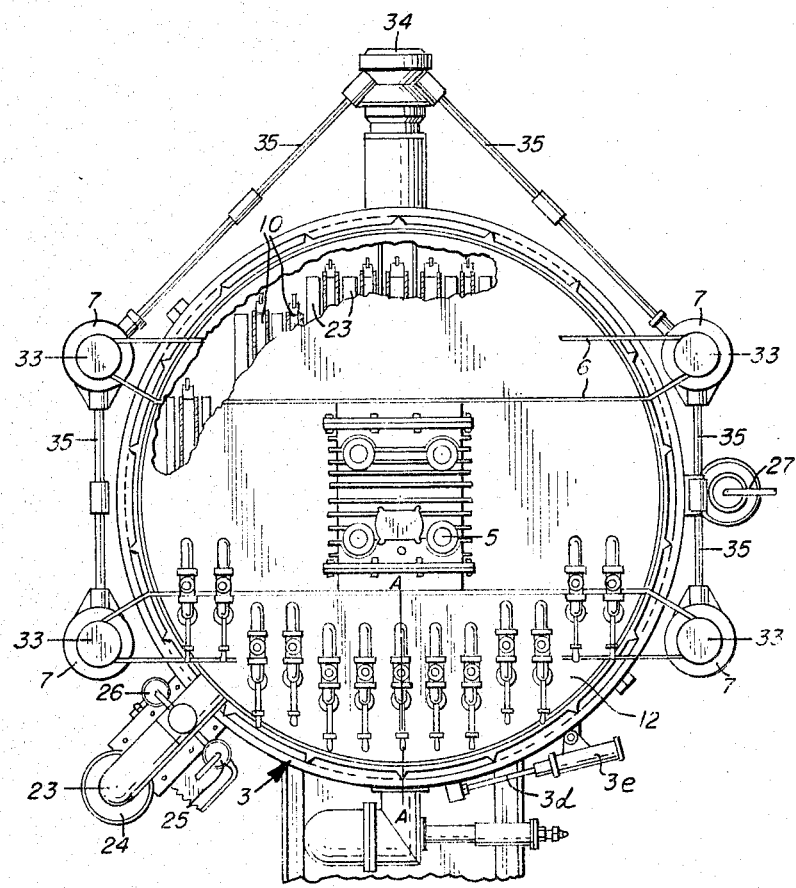
Figure 4:
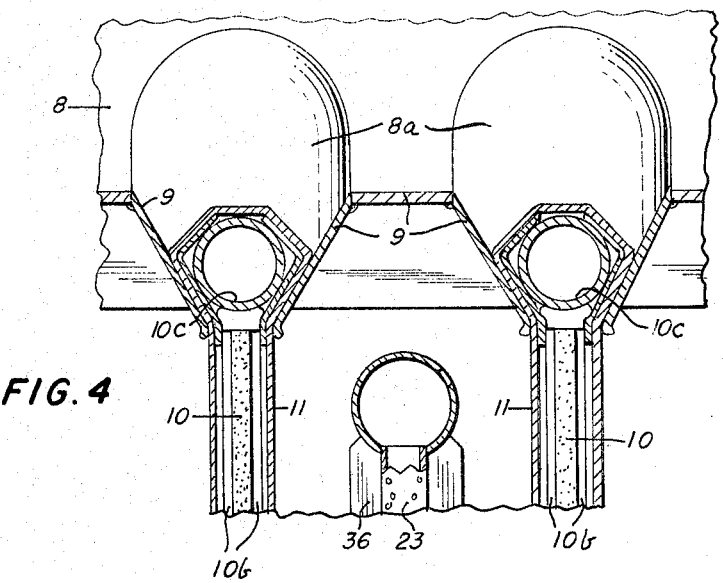
Figure 3:
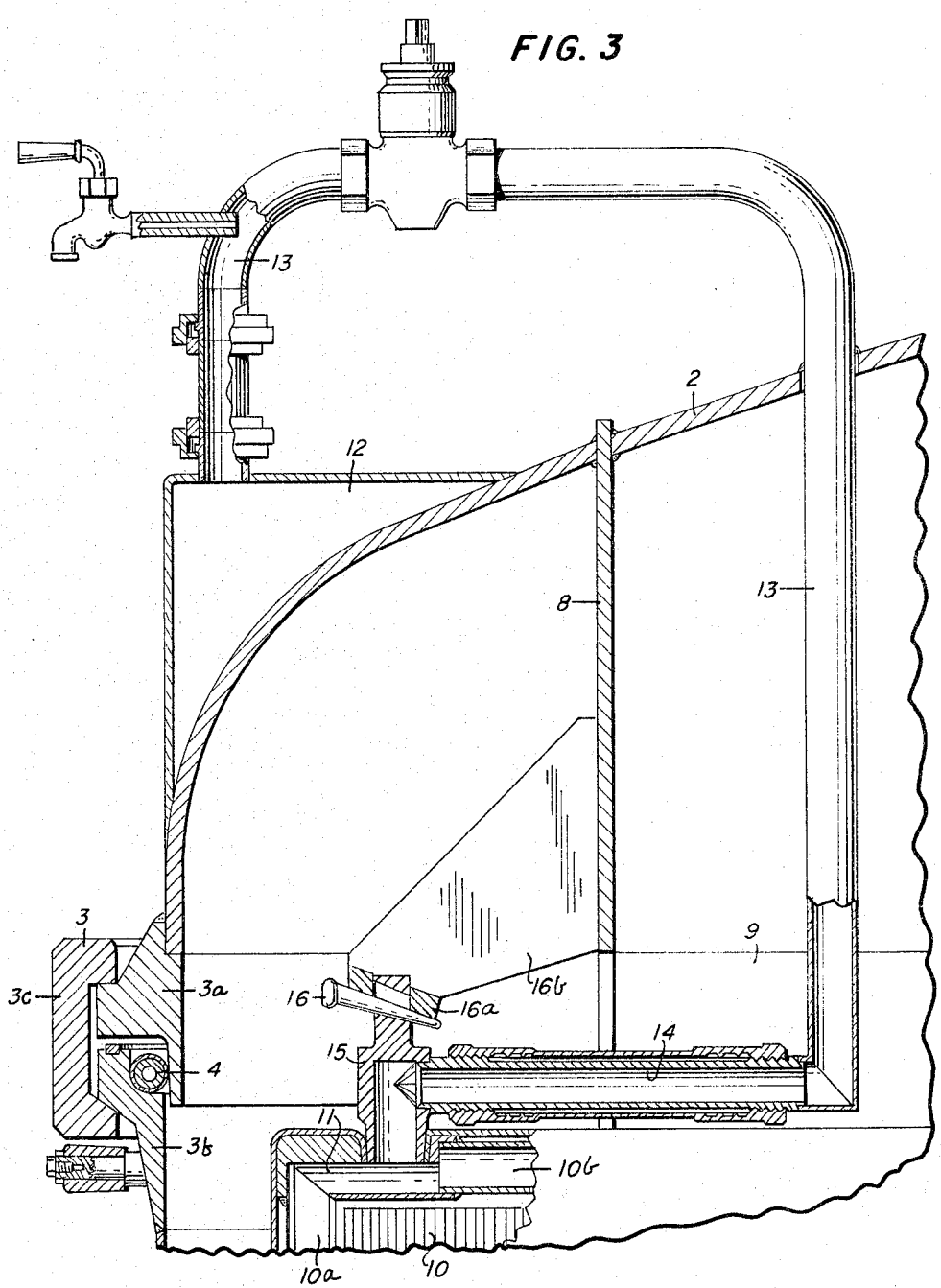

Further objects and advantages of the invention will become more readily apparent to one skilled in the art from the following detailed description and annexed drawings illustrating one embodiment for carrying out the invention, and in which drawings:

FIG. 1 is a view in elevation and partly in cross-section of the filter assemblage, FIG. 2 is a top plan view partly broken away of the assemblage shown in FIG. 1, FIG. 3 is a sectional view taken along the line A—A of FIG. 2, the view being on an enlarged scale, and showing a form of pressure seal which is somewhat modified from that of FIG. 1, and FIG. 4 is a fragmentary view in cross-section showing the means for attaching the filter elements to the cover and the means positioned between for washing the filter cloths.

As shown in FIG. 1, cylindrical body 1 of the assemblage is connected to a suitable base 1a by means of a flange 1b adjacent the lower end of the body. A spherical cover 2 is adapted to close the upper end of the body 1 and is coupled thereto by means of connection 3 which connection is capable of taking up the vertical stresses affecting the cover upon the occurrence of internal pressure within the body. More specifically, the connection 3 includes a peripheral flange 3a on the cover, a peripheral flange 3b on the body, an annular latch member 3c cooperable with the flanges and a hose 4 preferably of rubber located between the flanges and operative upon the introduction of fluid therein to tighten the clearance between the body 1 and cover 2.

The latch member 3c is operably connected to rod 3d of a hydraulic cylinder 3e pivotally attached to the body 1 with such connection allowing the latch member 3c to turn relative to the flange 3a (FIGURE 2).

A vibrator mechanism 5 for effecting vertical vibrations with its drive and supports 6 are positioned on the outer surface of the cover 2 (FIGS. 1 and 2). The supports 6 provide a rest for the cover when pressure is relieved from the body onto elastic supports 7 associated with upright screw hoists 33 for the cover 2. A drive 34 and Cardan joints 35 are operably associated with the hoists for rotating the same, as clearly shown in FIG. 2.

Two parallel bearing ribs 8 are welded to the inside of the cover 2 as disclosed in FIGS. 3 and 4 and are provided with gusset plates 16b of appropriate form therebetween. The lower edges thereof are formed with recesses providing grooves 8a for attaching filter elements 10 to the interior of the cover 2.

If there is no pressure in the filter body, the cover 2 with the elements fastened thereto rests on the elastic supports 7 and the flange 3a is slightly back from the upper projection of the latch 3c. If pressure is present in the body, the cover rises and thrusts againts the latch 3c.

The filter elements 10 are defined by plates of plastic or wood with numerous ducts 10b arranged therein passing onto the surface. The plates are fastened in metal casings 10a, for instance, of pipes and covered with filter cloth 11. The transverse sizes of the upper part of the casing 10c of the filter plate casing are larger than the thickness of its operating part and this upper part forms a retainer for hanging each of the elements in the grooves 8a between braces 9 of the ribs 8.

The ducts 10b of the filter elements 10 are connected to a circular collector of the filtrate 12 placed on the cover 2 by means of pipe 13, elastic hose 14 and fitting 15 with the fitting being locked by means of wedge 16. The wedge 16 bears against the fitting 15 on one side and against a plate 16a on the other side. The plate 16a is retained by the gusset plate 16b.

The collector 12 arranged on the cover 2 is provided with a conduit means 23' having a free end mounted in fluid seal component 24. The numeral 23 denotes tubes from which flows the washing liquid for the filter elements. The seal component 24 is also equipped with control valve 25 operably connected to a vacuum pump and control valve 26 to a source of compressed air. It is by virtue of the seal component 24 that the desired pressure drop between atmospheric pressure and that of the ducts of the filter elements 10 is realized.

The suspension which is to be processed is supplied automatically to the body 1 by pump means through valve 27 and pipe 28, as illustrated in FIG. 1. Supplementary unloading cone 18 for the deposit falling from the filter cloth is rigidly suspended from diametrically opposite sides to the cover 2 beneath the filter elements, by convex sheets 17. The manhole 19 and the gate 20 with the pipe 21 therein makes possible the discharge of the suspension through pipe 21 and valve 22 and the removal of air from the assemblage when the gate is locked.

The process of filtration in the assemblage is effected automatically and successively, and the duration of each subsequent operation is determined in dependence upon the conditions involved.

The suspension to be treated is automatically supplied through valve 27 and branch pipe 28 to the body by a pump capable of creating the desired head such as 6 atmospheres before filling and creating a vacuum within the ducts of the filter elements 10. The ducts 10b are connected via valve 25, conduit means 23', collector 12 and pipe 13 to the vacuum pump and the preliminary filtration begins with a thin deposit layer accumulating on the filter cloth 11. The filtrate is fed from ducts 10b through casing 10a, fitting 15, hose 14, pipe 13, collector 12, conduit means 23' and hydraulic seal 24 to the receiver.

With respect to creating a vacuum in the filter elements 10 via the valve 25, it should be pointed out that this is effected because prior to filtration under pressure during the period of suspension priming, a fine layer of deposits should be formed on the surface of the filter elements. The presence of a thin layer of deposits obtained with the assistance of a vacuum during the transition to filtration under pressure eliminates the penetration of small particles of the deposit into the filtration and assists in always maintaining the same clean.

The transition to filtration under pressure is performed and the preliminarily created thin layer on the cloth 11 assures the necessary purity of the filtrate.

The gate 20 is of a box type and is provided with guides 20a. A fluid cylinder 31 is attached to the gate and rod 30 of the cylinder is secured to the body 1. Hence, the gate 20 is capable of being shifted relative to the body 1 and the manhole for either opening or closing the manhole 19. In order to pack or seal the hiatus between the gate 20 and the lower edge of tapered bottom 1a in the event of internal pressure within the body 1, a hydraulic hose 20b is provided and fluid may be introduced into the hose for creating the packing or sealing. The hose 20b is similar in structural detail to the hose 4 shown in FIGURE 3.

The supply of suspension is arrested and compressed air is supplied through pipe 29 to dry the deposit and pulp drains through branch pipe 21 and valve 22 from the body. The pipe 29 is connected with a valve which may be arranged on the automatic control desk and the valve in turn may be connected to an air line via a compressor. The pressure is relieved in hose 4 and gate 20 with the gate being opened by rod 30 of fluid cylinder 31 and the simultaneous supply of compressed air by way of valve 26, conduit means 23', collector 12 and pipe 13 into the ducts of the filter elements 10 and activation of the vibrator. The numeral 32 in FIGURE 1 indicates a tube through which the air is removed from the filter during the period of priming suspensions into the filter. This is accomplished for eliminating the resistance which may be created by the air during suspension priming into the filter and the tube is connected with the valve and the valve in turn with ambient atmosphere. Hence, as a result, the dry layer drops from cloth 11 of the filter elements for delivery through the open manhole 19.

If the vibrator is inactivated, the gate 20 is locked and the regeneration of the cloth 11 is initiated by hot water pumped into tubes 23 and by the compressed air supplied to the ducts of the filter elements. The hot water supply to the tubes and the compressed air supply to the filter elements are stopped whereupon the next operation cycle begins.

All the operations of the filter process may be fully automated by means of an electric contact arrangement and a time relay set up in accordance with the program graph of the filter operation.

The invention is not to be confined to any strict conformity to the showings in the drawings but changes or modifications may be made therein so long as such changes or modifications mark no material departure from the spirit and scope of the appended claims.

The invention is not to be confined to any strict conformity to the showings in the drawings but changes or modifications may be made therein so long as such changes or modifications mark no material departure from the spirit and scope of the appended claims.

I claim:

1. An automatic filter assemblage for cyclic action operating under vacuum as well as pressure conditions for the filtration of various suspensions including toxic and radiant suspensions, comprising a cylindrical body having upper and lower ends, a base for the lower end, a cover for the upper end, means for providing a fluid tight connection between the cover and the upper end of the body yet permitting vertical movement of the cover relative to the body, means exteriorly of the body for elastically supporting the cover for such vertical movement, a plurality of spaced apart filter elements adapted to be vertically disposed within the body, means for detachably and rigidly securing the filter elements to the cover, each of said filter elements including a perforated plate and a filter cloth covering the plate, a conical guide within the body below the filter elements rigidly secured to the cover, means for supplying the suspension to be treated to the filter elements whereby a deposit accumulates on the filter cloths, a filtrate collector on the cover, conduit means leading from the filter elements to the collector, means for supplying compressed air to the filter elements to dry the deposit on the cloth of each element, discharge means for the deposits on the filter cloths located below the conical guide and associated with an opening in the base, and vibration developing means mounted on the exterior of the cover for imparting vertical vibrations to the cover, the filter elements and the conical guide for removing the deposit from the filter cloths and feeding the same to the discharge means.

2. The automatic filter assemblage as claimed in claim 1, including a conical bottom for the body arranged coaxially of the conical guide and leading to the discharge means.

3. The automatic filter assemblage as claimed in claim 1, including perforated conduit means located between the filter elements adapted to have water supplied thereto for washing the filter cloths.

4. The automatic filter assemblage as claimed in claim 1, in which the fluid tight connection means includes peripheral flanges adjacent the lower end of the cover and the upper end of the body, an annular latch having projections cooperable with said flanges and a resilient hose located between the flanges and operative upon the introduction of fluid therein to tighten the clearance between the body and the cover.

5. The automatic filter assemblage as claimed in claim 1, including a fluid seal defining means located exteriorly of the body, and conduit means leading from the filtrate collector to the fluid seal defining means.

6. The automatic filter assemblage as claimed in claim 1, in which said discharge means includes a movable gate, a pipe therein and a valve for the pipe.

References Cited by the Applicant
UNITED STATES PATENTS

| | | | |
|---|---|---|---|
| 2,480,320 | 8/1949 | Carrier | 210—332 X |
| 2,578,636 | 12/1951 | Smith et al. | 210—388 X |
| 2,742,158 | 4/1956 | Schuller | 210—333 |
| 2,854,142 | 9/1958 | Baker | 210—332 |
| 2,867,324 | 1/1959 | Hirs | 210—387 X |
| 2,874,848 | 2/1959 | Cannon et al. | 210—332 |
| 2,902,160 | 9/1959 | Anderson | 210—388 |

REUBEN FRIEDMAN, *Primary Examiner.*

HERBERT L. MARTIN, T. R. MILES,
*Assistant Examiners.*